June 18, 1968  C. W. STOKES ET AL  3,388,671
CENTRIFUGAL PUMP
Filed July 15, 1965
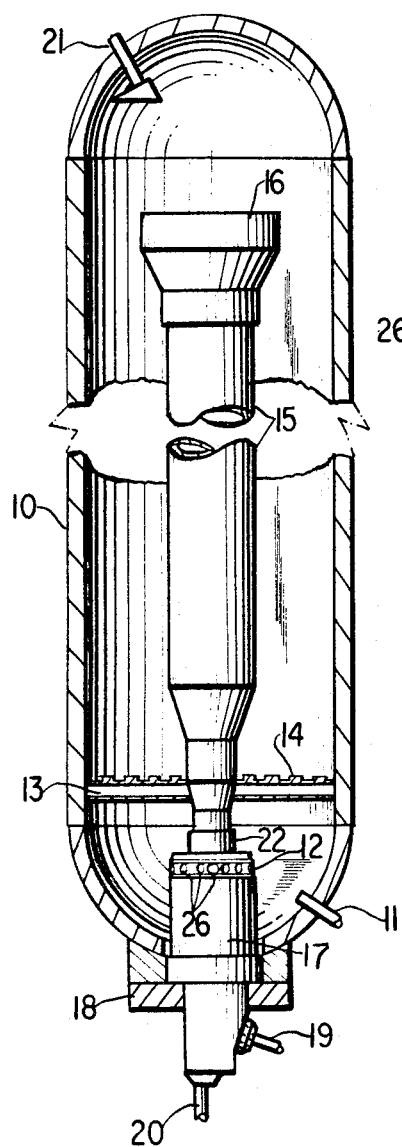
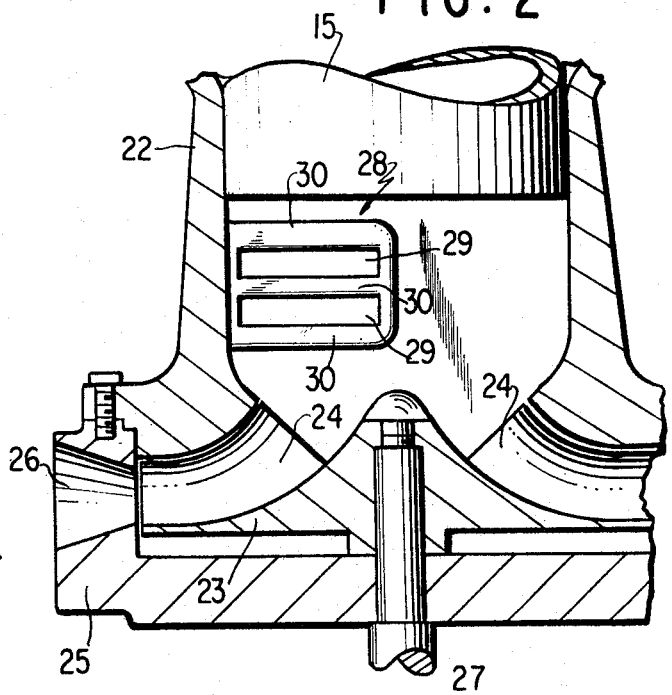
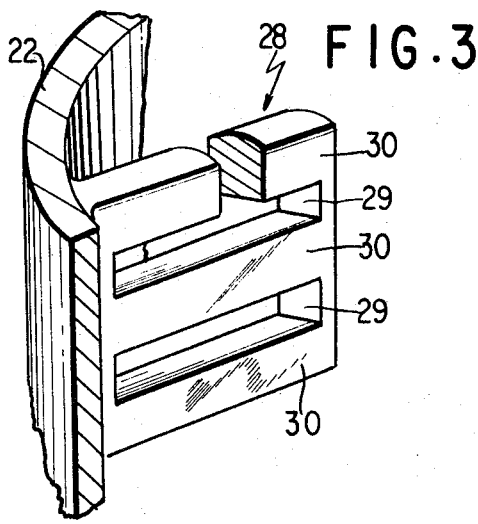
INVENTORS
CHARLES W. STOKES
EMORY D. MATTIX
BY
ATTORNEY

United States Patent Office 3,388,671
Patented June 18, 1968

3,388,671
CENTRIFUGAL PUMP
Charles W. Stokes and Emory D. Mattix, Lake Charles, La., assignors to Cities Service Research and Development Company, New York, N.Y., a corporation of Delaware
Filed July 15, 1965, Ser. No. 472,153
4 Claims. (Cl. 103—111)

This invention relates to an improvement in a centrifugal pump and more particularly to a baffle which is commonly found in the inlet to a centrifugal pump.

It is common practice to place a baffle in the inlet to a centrifugal pump. The baffle serves the purpose of reducing pre-rotation of the liquid before it enters the impeller of the pump. The reason that this pre-rotation action of the liquid is undesirable is that it results in vortex formation in the pump inlet. The vortex which is formed in the pump inlet prevents the pump from operating at maximum efficiency. The placement of the baffle in the pump inlet impedes the rotational flow of the liquid in the inlet, and thus prevents the characteristic vortex formation in the pump inlet. However, in certain processes, though the vortex formation in the pump inlet is eliminated, certain undesirable side effects may result. For instance, in the process of hydrogenation of hydrocarbon oil an undesirable side effect produced by the placement of a baffle in the inlet of a centrifugal recycle pump is the formation of coke deposits on the lee face of the baffle where oil tends to stagnate. The coke deposits may build up to such a degree, that eventually the pump inlet becomes obstructed and interferes with the effective operation of the pump.

It is an object of this invention to provide a centrifugal pump incorporating an improved vortex splitting baffle.

Another object of this invention is to provide means to prevent the formation of coke deposits on the lee face of the baffle, in order to keep the pump inlet open and to allow the pump to operate efficiently.

Yet another object of this invention is to provide means to prevent the formation of deposits on the lee face of the baffle, when the baffle is positioned in the pump inlet and the pump is positioned in a reactor for carrying out liquid phase reactions.

These and other objects of this invention will become apparent from the description of the invention which follows and from the accompanying drawings, in which:

FIG. 1 is a substantially central vertical cross-section, with parts in elevation, of a reactor containing a centrifugal recycle pump.

FIG. 2 is a partial vertical section of the pump impeller disc, slotted vortex splitting baffle and associated parts.

FIG. 3 is a partial prospective view showing the vortex splitting baffle.

The reactor 10 as shown in FIG. 1, may be utilized in the hydrogenation of hydrocarbon oil. It is preferably a vertical cylindrical vessel of such construction that it will withstand temperatures and pressures which would be typically encountered in hydrogenation processes.

For the purpose of hydrogenation of a liquid, a reactant inlet for the hydrogen gas and liquid is provided at 11, such reactant in liquid phase passing through the lower portion of the reactor and mixing with the liquid discharged from a centrifugal pump 12. The total liquid and gas then pass upwardly through a distributor plate 13. The distributor plate 13 may be provided with a series of bubble caps 14 which are commonly mounted on a perforated tray in a suitable manner to permit the reactant to flow upwardly through the reactor.

For hydrogenation purposes, the reactor is usually filled with contact material, which may be from the size of a slurry to particulate solids. In order to accomplish the desired contact the liquid will flow upwardly through such a bed of contact material at a rate of from 20 to 200 gallons per minute per square foot of horizontal cross-section of the reactor. As this flow rate is normally above the expected feed rate, the total flow required is accomplished by recycling more or less of the liquid from the upper part of the reactor back to the bottom of the reactor.

It has been found entirely practical to use an internal conduit 15 for such recycle. This conduit is preferably provided with an outwardly and upwardly flared bell-top 16 which is located above any usual operating level of catalyst and thus serves as an entrainment separator. A minimum of entrained gas or material is carried over into the central conduit 15 which extends downwardly to below the distributor tray 13. This conduit thus serves to supply the pump 12 which is required to accomplish sufficient pressure head on the liquid to cause it to rise through the solids in the reactor and place them in random motion. Pump 12 may be driven as by motor 17 which is mounted on manhead 18. Motor 17 which is employed is hydraulic, though it may be gas or electric as well. Motor 17 has a pressure inlet line 19 and a pressure return line 20, which operates in a conventional manner. Product outlet 21 is provided to allow for the exit of fluid from the reactor.

The inlet 22 to pump 12 is adapted to telescope in a slip fit over the exit of conduit 15. This is designed so that the back-flow of liquid into the conduit 15 is a minimum and mechanical interference is prevented. A positive head on the pump impeller 23 (shown in FIG. 2) is assured by the height of the liquid in conduit 15.

In FIG. 2, the impeller 23 is preferably of the semi-open type and has curved blades 24 which cooperate with diffuser section 25 of the pump. The diffuser section has a plurality of openings 26 and thus discharges liquid through substantially 360° of the horizontal plane of the impeller 23. The impeller 23 is driven by the shaft 27 of motor 17, not shown in FIG. 2.

A baffle 28, integral with pump inlet 22, avoids vortex formation and facilities smooth flow to the eye of the impeller 23. Slots 29 are cut radially along the length of the baffle 28. The slots 29 in the baffle 28 are preferably cut along about 85% of the radial length of the baffle. The slots 29 in the baffle 28 are conveniently about ½ inch in width, although slots having a width from about ¼ inch to about ¾ inch may be employed. In the form shown, the slots 29 in the baffle 28 define three equal uncut areas 30 on the face of the baffle 28.

From the foregoing it will be noted that the design of the baffle 28, will achieve the desired result of eliminating the formation of coke deposits on the lee face of the baffle, i.e., downstream of the direction of rotation of the liquid. The slots 29 provided in the baffle 28, allow liquid to flow through the slots 29 and thereby agitate the lee space adjacent the baffle 28 and flush any stagnant liquid that has accumulated. The slots 29, provided in the baffle 28, do not, however, unduly diminish the vortex breaking action of the baffle 28.

When the apparatus described above was operated for hydrocracking of heavy hydrocarbon oils with a solid vortex splitting baffle (no slots being provided) in the pump inlet 22, it was found that although the vortex was broken, deposits of coke were formed on the lee face of the baffle. These coke deposits built up and resulted in obstruction of the pump inlet. It was determined that over 50% of the pump inlet had become closed by the deposited coke. The replacement of the solid baffle with a baffle having the aforementioned slots provided in the baffle eliminated the condition of coke formation on the lee face of the baffle. The pump inlet subsequent to the insertion of the slotted baffle, remained free and unobstructed.

While in the embodiment illustrated, slots were employed to allow liquid to flow through and thereby agitate the lee space adjacent the baffle and prevent coke formation on the lee face of the baffle, many other types of openings could readily be employed to achieve the same effect. The openings employed could take the form of various goemetrical shapes such as circles, squares, etc. If the openings took the form of a circle, the diameter of the circle would generally be from about ¼ inch to about ¾ inch. If square openings were employed, the side of the square would generally be from about ¼ inch to about ¾ inch.

The area cut out of the baffle can vary over wide limits, with about 15% to about 35% of the total area of the baffle being cut out preferred.

In the illustrated embodiment, as shown in FIG. 3 the baffle plate 28 is an essentially flat plate. It is within the scope of the present invention, however, to utilize a baffle having various cross-sectional configurations. For example, a baffle having a generally curved cross-sectional configuration may be employed.

Obviously many modifications and variations of the present invention are possible in the light of the above teachings. It is, therefore, to be understood that within the scope of the appended claims the invention may be practiced otherwise than as specifically described.

What is claimed is:

1. In a substantially vertical elongated reactor for carrying out liquid phase reactions, said reactor having an internal conduit forming a first liquid path within said conduit and a second liquid path outside of said conduit between the upper part of said reactor and the lower part of said reactor, a pump at the lower part of said reactor having an inlet in communication with one of said liquid paths and adapted to receive a liquid mixture from said path and to discharge in said other path and a baffle positioned in said inlet so as to inhibit pre-rotation of liquid in said inlet, the improvement which comprises providing said baffle with an opening adapted to inhibit stagnation of liquid adjacent the lee face of said baffle, so as to prevent the formation of deposits on the lee face of said baffle which would result in obstruction of said pump.

2. The apparatus as recited in claim 5 wherein said baffle is positioned radially in said liquid inlet and said baffle is provided with a plurality of openings, and openings comprising from about 15% to about 35% of the area of said baffle.

3. The apparatus as recited in claim 2 wherein said openings extend over about 85% of the radial length of said baffle.

4. The apparatus as recited in claim 2 wherein said openings comprise a plurality of slots, each of said slots having a width of about one-quarter of an inch to about three-quarters of an inch.

References Cited

UNITED STATES PATENTS

| 2,069,640 | 2/1937 | Beardsley | 103—111 |
| 2,357,485 | 9/1944 | Miller | 103—115 |
| 2,406,499 | 8/1946 | Jandasek | 103—115 |
| 2,637,487 | 5/1953 | Sawyer | 230—122 |
| 3,014,430 | 12/1961 | Schneider | 103—115 |

FOREIGN PATENTS

| 1,155,343 | 4/1957 | France. |
| 864,512 | 1/1953 | Germany. |
| 754,055 | 8/1956 | Great Britain. |
| 834,007 | 5/1960 | Great Britain. |

HENRY F. RADUAZO, *Primary Examiner.*